May 18, 1954 M. L. DOELZ 2,679,006

FREQUENCY SELECTOR

Filed May 16, 1949 2 Sheets-Sheet 1

INVENTOR

Melvin L. Doelz

FREQUENCY SELECTOR

Filed May 16, 1949 2 Sheets-Sheet 2

INVENTOR
Melvin L. Doelz

Patented May 18, 1954 2,679,006

UNITED STATES PATENT OFFICE 2,679,006

FREQUENCY SELECTOR

Melvin L. Doelz, Cedar Rapids, Iowa, assignor to Collins Radio Company, Cedar Rapids, Iowa, a corporation of Iowa Application May 16, 1949, Serial No. 93,451

14 Claims. (Cl. 250—36)

This invention relates in general to apparatus for obtaining a plurality of accurately controlled frequencies and in particular to a frequency selector which utilizes a binary system of numbers rather than the customary decade system.

Perhaps the most stable generator for electrical wave propagation is the crystal controlled master oscillator. With such an oscillator very stable frequency control can be maintained and with the use of suitable frequency multipliers, frequencies other than the base frequency may be obtained which retain the inherent stability of the base frequency. In order to obtain a large number of such frequencies closely spaced and over a wide frequency range, a synthesizer has been used which can select 100 different frequencies and if interpolation is desired another selector is connected to the first and $(100)^2$ or 10,000 points are obtained. It appears that as selector units with 100 different settings are added the total points available is proportional to $100^n$ where $n$ is the number of selectors used. It is seen that in order to cover a large portion of the frequency spectrum, a very large number of circuit elements must be used.

An object of this invention is to provide means for obtaining a plurality of frequencies which have an accuracy of the same order as a crystal oscillator and which eliminates the need of variable frequency oscillators and filters.

It is an object of this invention, therefore, to provide a frequency control device which is based on the binary number system rather than the decade number system.

A further object is to provide a frequency control device which is simple and compact to build and which may be cheaply manufactured.

Yet another object of this invention is to provide an improved frequency control device.

To provide a frequency generator which may be adjusted to obtain frequencies very close together over a broad frequency spectrum is still another object of this invention.

A feature of this invention is found in the provision for a master control oscillator from which a base frequency is derived. Frequency multipliers generate various harmonics of the base frequency. A series of selector units are connected with the output of a unit fed into the succeeding unit and an adjustable frequency is fed to the input of the first selector unit from a second oscillator or from one of the frequency multipliers. Each selector unit contains a divider which divides the input frequency in half and a two-way switch which selects one of two harmonics. A mixer mixes the chosen harmonic and halved input and a by-pass filter allows the desired frequency to pass to the next selector unit. The output from the final selector may be mixed with any other frequency to position the selectivity on the frequency spectrum.

Further objects, features and advantages of this invention will become apparent when considered in the light of the specification, claims and drawings, in which:

Figure 1:
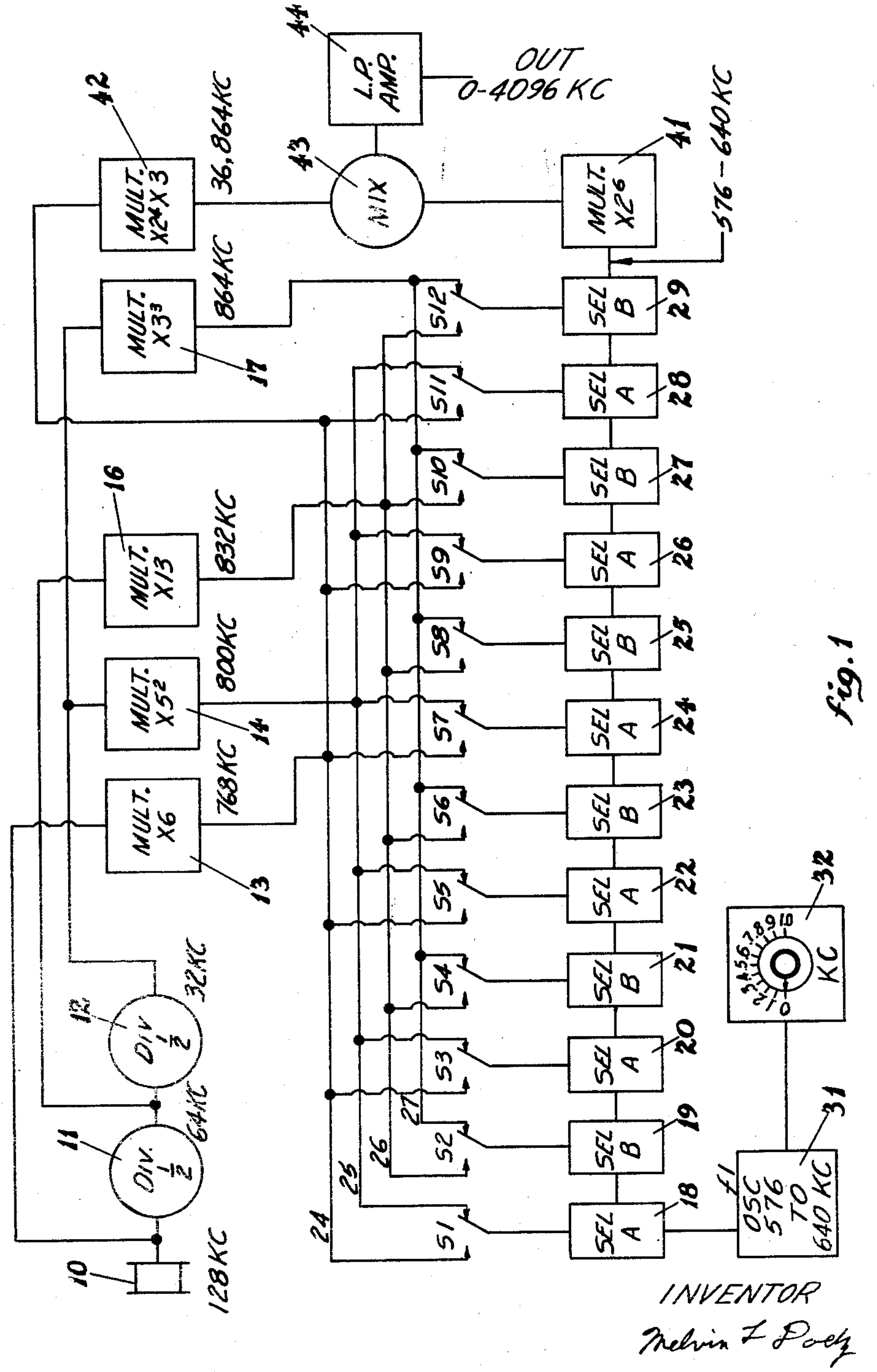
Fig. 1 is a schematic diagram of an embodiment of this invention having 12 selector units.

A very simple electrical circuit is capable of making two determinations; (1) a signal is present, or (2) it is not present. With this in mind, the applicant devised the method of obtaining a number of selected frequencies based on a binary system of numbers by successive division and addition (or subtraction) of frequency.

In order to show that a binary system may be constructed by successive addition and division, a base frequency of unity is assumed and the further assumption is made that certain harmonics of this base frequency are available. A set of numbers, $g_j$ are defined which may be either unity or zero at our choice so that $n_j+n_j$ is either $n_j$ or $n_j+1$. If $n_j+g_j$ is divided by 2 and added to $n_2+g_2$, the quantity $$\frac{n_1+g_1}{2}+n_2+g_2$$

is obtained. If this quantity is in turn divided by 2 and the process continued to $n_p+g_p$, the following series is obtained:

$$f=\frac{n_1+g_1}{2^{p-1}}+\frac{n_2+g_2}{2^{p-2}}+\ \ldots\ \frac{n_p+g_p}{2^0}$$

The terms containing $n$ may be separated from the terms containing $g$ to obtain the following two series:

$$f=\frac{1}{2^{p-1}}(n_1+2n_2+\ \ldots\ +2^{p-1}n_p)+\frac{1}{2^{p-1}}(g_1+2g_2+2^2g_3+\ \ldots\ 2^{p-1}g_p)$$

By definition the first series is a fixed quantity which can be chosen as any multiple of $$\frac{1}{2^{p-1}}$$

by proper choice of the $n_j$ and the second series is recognized as developing a complete system of binary numbers with the $g_j$ being the binary digits and the unit being $$\frac{1}{2^{p-1}}$$

times the base frequency.

With the proper interpretation of the $g$'s the second series may be obtained by alternate subtraction and division instead of addition and division. To illustrate this, take $n_1+g_1$ divide by two and subtract from the quantity, $n_2+g_2$, to obtain $$(n_2+g_2)-\frac{(n_1+g_1)}{2}$$

If this is divided by two then the quantity $$\frac{(n_2+g_2)}{2}-\frac{(n_1+g_1)}{4}$$

is obtained. This is subtracted from $n_3+g_3$ and so on, until the series:

(1)

$$(n_{13}+g_{13})-\frac{(n_{12}-g_{12})}{2^1}+\frac{(n_{11}+g_{11})}{2^2}\ \cdots\ -\frac{(n_2-g_2)}{2^{11}}+\frac{(n_1+g_1)}{2^{12}}$$

is obtained.

This series can be broken into two parts, to wit:

(2)

$$n_{13}-\frac{n_{12}}{2^1}+\frac{n_{11}}{2^2}\ \cdots\ +\frac{n_1}{2^{12}} \text{ and } +$$

$$g_{13}+\frac{g_{12}}{2^1}+\frac{g_{11}}{2^2}+\ \cdots\ \frac{g_1}{2^{12}}$$

Suppose we select $n$'s so that the $n$ part of the series above will equal 18. Since $g$ has been defined as always equal to either one or zero, the $g$ part of the series may have any value between zero and $$\left(2-\frac{1}{2^{12}}\right)$$

Thus the sum of the series may be any value between 18 and almost 20 in $$\frac{1}{2^{12}}$$

increments.

The $n$ portion of the series can be broken into the even and odd terms to obtain:

(3) $$n_{13}+\frac{n_{11}}{2^2}+\frac{n_9}{2^4}+\ \cdots\ \frac{n_1}{2^{12}}$$

and (4) $$-\frac{n_{12}}{2}-\frac{n_{10}}{2^3}-\frac{n_8}{2^5}\ \cdots\ -\frac{n_2}{2^{11}}$$

Assume that all the even $n$'s are each equal to 25 and all the odd $n$'s except $n_1$ are each equal to 26. Let $n_1$ equal 18 and evaluate Equations 3 and 4. With these values for the $n$'s it will be found that the sum of Equations 3 and 4 is exactly 18 units. The apparatus of Figure 1 satisfies these conditions if the variable frequency oscillator 31 is allowed to take only the two discreet values $18\times32=576$ kc. or $19\times32=608$ kc. If this oscillator is made continuously variable from the 576 to 640 kc., that is from 18 to 20, the effect is the same as allowing $g_1$ to vary between 0 and 2 in Equation 2 and continuous interpolation between the discreet frequency values determined by the remaining $g$'s is obtained.

A master oscillator 10, which is crystal controlled provides a very stable frequency output. This frequency may be 128 kc. for example.

A pair of dividers 11 and 12, divide and subdivide the 128 kc. to 64 kc. and 32 kc. The 2-to-1 divider may be the well known Eccles-Jordan divider. 32 kc. is the base frequency in this example and corresponds to unity in our previously derived formula.

A multiplier 13 multiplies the master oscillator frequency by 6 to obtain 768 kc. which is the 24th harmonic of the base frequency 32 kc. A second multiplier 14 multiplies the base frequency by 25 to obtain the 25th harmonic, and a third multiplier 16 obtains the 26th harmonic of the base frequency by multiplying 64 kc. by 13. The 27th harmonic is obtained with multiplier 17, by multiplying the base frequency by 27. It is seen, therefore, that the 24th, 25th, 26th and 27th harmonics of the base frequency have been obtained.

A series of selector units, numbered 18 to 29 in Fig. 1, are fed the four harmonics obtained by the multipliers. Twelve selector units are illustrated and comprise two types of units, A and B. They are alternately spaced so that they progress A to B to A, etc.

A variable frequency oscillator 31 may be adjusted to any frequency between 576 kc.–640 kc. in one kc. steps by means of the interpolator 32. This corresponds to a range between the 18th and 20th harmonic of the base frequency 32 kc. The output of generator 31 is fed into the first selector unit A18.

Selector unit A includes an amplifier 33, which amplifies the input signal and passes it to a divider 34, which divides the frequency in half. If the input frequency to the divider was 640 kc. which represents the 20th harmonic of the base frequency, then the divider 34 will furnish 320 kc. A band pass filter 36 passes the desired frequencies between 288–320 kc. and filters out any extraneous frequencies. A two-way switch 37 is connected to the selector unit A and may be switched to obtain either the 24th or 25th harmonic of the base frequency. The harmonic selected, is mixed by a mixer 38, with the frequency from the divider 34, to obtain beat frequencies of both the sum and the difference of the two frequencies. A second band pass filter 39, passes frequencies between 448–512 kc. which represents the 14th to 16th harmonics. If, for example, the 24th harmonic is selected by switch $S_1$, it will be mixed with a frequency between the 9th and 10th harmonic of 32 kc. obtained by division by two of the input oscillator frequency to obtain an upper side-band between 33 and 34 times 32 kc. and a lower side-band between 14 and 15 times 32 kc. The band pass filter 39 will allow only the lower side-band to pass because its pass band covers the range from 14 to 16 times 32 kc. This output is fed into the following selection unit B. It is seen, therefore, that if we hold the frequency of the variable frequency oscillator 31 constant, two different frequencies may be obtained from the selector unit A. The first one corresponding to the 24th harmonic and the second one to the 25th harmonic.

Figure 3:
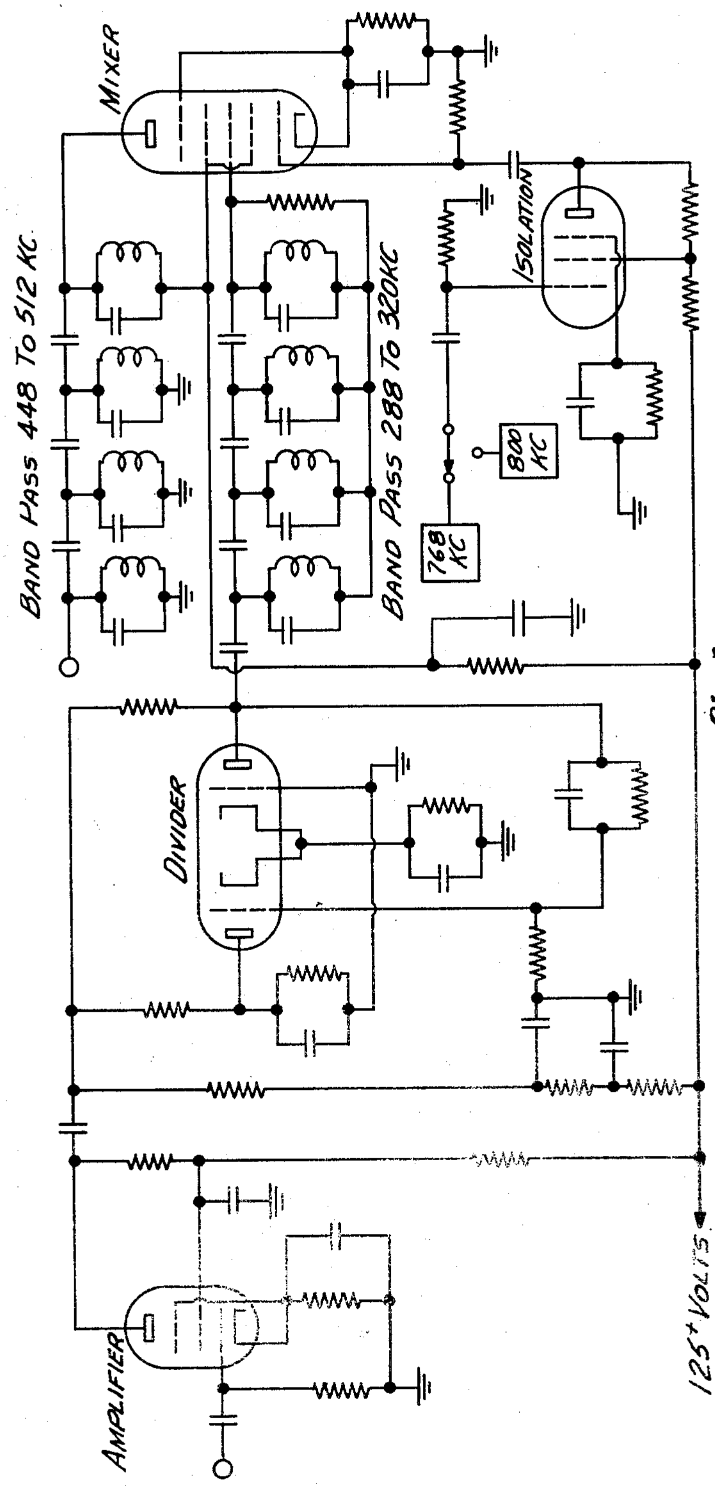
Fig. 3 is a circuit diagram of a selector unit "A."
Figure 2:
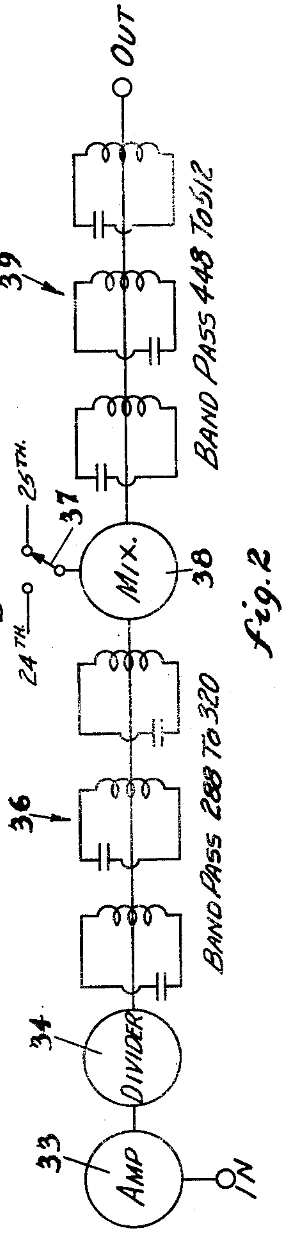
Fig. 2 is a detailed schematic view of a selector unit "A,"

Figure 3 is a circuit diagram of the selector unit A shown schematically in Figure 2 and comprises an amplifier which may be of any suitable type that will amplify a signal before passing it to the divider. The divider may be the well known Eccles-Jordan circuit which will divide the input frequency by two. The output of the divider is passed through a 288–320 kilocycle band-pass filter to eliminate all frequencies outside this range. The output of the band-pass filter is supplied to a grid of a mixer tube. The mixer tube also receives a signal from an isolation tube. The isolation tube may be connected to either a 768 kilocycle source or an 800 kilocycle source, the 768 kilocycle corresponding to the multiplier 13 illustrated in Figure 1, and the 800 kilocycle source corresponding to the multiplier 14 illustrated in Figure 1. The mixer furnishes an output to a second band-pass filter for the range 448–512 kilocycles which passes the difference between the two input frequencies. The two band-pass filters may be of any well known type. The functions of the selector unit are amplifying, dividing, filtering, selecting 768 kilocycles or 800 kilocycles, mixing and filtering again, and furnishing an output.

Selector unit B is in all respects similar to selector unit A except that the two band pass filters have different values. The band pass filter between the divider and mixer in unit B passes frequencies between 224 kc. to 256 kc. and the second band pass filter passes frequencies between 576 kc. to 640 kc. and the selector switch $S_2$ chooses the 26th or 27th harmonic. The output of selector unit B is between 576 kc. and 640 kc. and is fed into the second selector unit A designated as 20. It is seen that four different output frequencies may be obtained from the first selector unit B with a constant output frequency from the variable oscillator 31. These frequencies correspond to: (1) $S_1$ and $S_2$ to the left choosing the 24th and 26th harmonic respectively; (2) $S_1$ to the right, $S_2$ to the left choosing the 25th and 26th harmonic, respectively; (3) $S_1$ and $S_2$ to the right choosing the 25th and 27th harmonic; and (4) $S_1$ to the left, $S_2$ to the right to choose the 24th and 27th harmonics, respectively.

As more selector units are added, it is seen that the output frequencies obtainable are equal to $2^n$ where $n$ is the number of selector units. It is interesting to note that the output of every A unit is between the14th –16th harmonic and the output of each B unit is between the 18th–20th harmonic.

The system shown in Fig. 1 has 12 selector units, so that at the output of the last B unit, $2^{12}$ or 4096 frequencies are obtainable over a 64 kc. range. Thus by setting the 12 switches it is possible to go from 576 kc. to 640 kc. in steps of 15.6 cycles per second. To obtain a more usable output, a multiplier 41, multiplies this output by 64 to obtain a range from 36,864 kc. to 40,960, kc. Another multiplier 42, obtains 36,864 kc. by multiplying the 24th harmonic by 48 and a mixer 43, mixes the output of multipliers 41 and 42, to obtain frequencies from 0 to 4096 kc. in steps of 1 kc. A low pass filter amplifier 44, removes undesired frequencies. If it is desired to operate between limits other than 0 to 4096 kc., the output multiplier 41 may be mixed with a frequency from multiplier 42, which will give the desired range.

It is also possible to multiply the output frequency by two to obtain selection from 0 to 8192 kc. in steps of 2 kc. The stability of the frequency of the output is proportional to the stability of the master oscillator 10. The variable frequency oscillator 31, may be used for interpolation between 1 kc. steps if finer adjustment is desired. It is seen that instability of this variable frequency generator will effect the output very little because a variation of 64 kc. is required in the oscillator 31, in order to vary the output 1 kc.

The settings of the twelve selector switches to obtain a particular frequency is best illustrated by an example. Suppose that it is desired to obtain a frequency of 4023 kc. The setting is obtained by the following method. The last figure 3 is odd so a one is marked down as the setting of $S_{12}$. The 1 is subtracted from 4023 to obtain 4022, and this number is divided by 2 to obtain 2011. This number is also odd, so the setting of $S_{11}$ is one. The one is again subtracted and the remainder divided by two to obtain 1005. A one is marked down as the setting of $S_{10}$ and the process repeated. This time an even number, 502, is obtained and, therefore, the setting of $S_9$ is zero. Zero is subtracted from 502 and it is then divided by two to obtain 251, an odd number. This process is carried out until all 12 positions are obtained and the switches are set by letting the up position correspond to one and the down position correspond to zero. When the zero position of the switch is chosen, the 24th harmonic is chosen in the A unit and the 27th harmonic in the B unit. The up, or "one" position corresponds to the 25th harmonic in the A unit and the 26th harmonic in the B unit.

If the number becomes zero before all settings are given, it merely indicates that all switches remaining to the left are set at zero. For example, if a frequency of 5 kc. were desired, $S_{12}$ would be up in the "one" position, $S_{11}$ would be down in the zero position, $S_{10}$ would be up in the odd position, and all switches to the left of $S_{10}$ or $S_1$ to $S_9$ would be set at zero.

It is understood that as many selector units may be used as is desired depending on the number of different steps desired over the frequency spectrum. Other base frequencies and harmonics of the base frequency may be used, but the ones given are merely examples to show one practical system.

Although this invention has been described with respect to a preferred embodiment thereof, it is not to be so limited since modification and changes may be made therein which are within the full intended scope of the invention as defined in the appended claims.

I claim:

1. A frequency selector device comprising, generating means producing a basic frequency signal, a harmonic generator connected to said generating means and producing a plurality of harmonics of said basic frequency signal, a plurality of selector units each having two input terminals and an output terminal with the first of said selector units connected to said harmonic generator to receive one of a pair of harmonic signals of the basic frequency, a signal generator connected to the second input terminal of the first selector unit, said output terminal connected to the first input terminal of the second selector unit and the output of each succeeding selector unit connected to the first input of the following selector unit, each selector unit connected to the harmonic generator and receiving one of two of said harmonic signals into its second input terminal, and an output terminal connected to the last of said selector units.

2. In a frequency selector device having generating means for producing a basic frequency signal, and a harmonic generator connected to said generating means to produce a plurality of harmonic signals of said basic signal, a selector unit comprising, divider means for dividing the frequency of an input signal in half, selector-mixing means connected to said divider and said harmonic generator and selecting and mixing one of said harmonic signals with the divided signal, and output terminals connected to said mixer.

3. In a frequency selector device having generating means for producing a basic frequency signal, a harmonic generator connected to said generating means, an input signal source, a selector unit comprising a frequency divider connected to said signal source and dividing the input frequency by two, a selector switch connected to said harmonic generator and connecting one of said harmonic signals to said selector unit, mixing means connected to said selector switch and the frequency divider for mixing said chosen harmonic with the divided signal, and output terminals connected to said mixing means.

4. A frequency selector device comprising, generating means for furnishing a substantially constant basic frequency signal, a harmonic generator connected to said generating means and producing a plurality of harmonics of said basic signal, a plurality of selector units connected together with the output of one unit fed into the input of the following unit, a selector switch on each unit connected to said harmonic generator to select one of two harmonics from said harmonic generator, variable frequency generating means connected to the input of the first of said selector units, and an output signal taken from the last unit.

5. A device according to claim 4 in which the mixing means mixes the 1,152nd harmonic of the base frequency to the output of the last selector unit to obtain 4096 output frequencies in steps of 1 kc. apart over the range of 0 to 4096 kc.

6. A frequency selector device comprising a master oscillator generating a base frequency of 32 kilocycles, multiplying means connected to said master oscillator and producing a plurality of harmonics of the base frequency, a series of 12 selector units with their outputs connected to the inputs of the next succeeding unit, a signal generator and the multiplying means connected to the first of said selector units, a two-way switch connected to each selector unit and said multiplying means with the switch on the first, third and each succeeding alternate unit furnishing either the 24th or 25th harmonic to the unit and the switch on the second, fourth, and each succeeding alternate unit furnishing either the 26th or 27th harmonic to the unit, mixing means connected to the output of the last selector unit and to said multiplying means to obtain 4096 output frequencies.

7. In a frequency selector device having a master oscillator generating a base frequency of 32 kilocycles, multiplying means connected to said master oscillator and producing the 24th and 25th harmonics of said base frequency, a frequency generator producing various frequencies between the 18th and 20th harmonics of said base frequency, a selector unit comprising a pair of inlet terminals and an outlet terminal, a two-way selector switch connected to the first inlet terminal, said frequency generator connected to said second input terminal, a divider in the selector unit for dividing the frequency fed into said second input terminal in half, said two-way switch connectible with either the 24th or 25th harmonic from said multiplying means, mixing means connected to said divider to mix its output with either the 24th and 25th harmonic from the two-way switch, and a band pass filter connected to said mixing means and passing the frequencies between the 14th–16th harmonic to an output terminal.

8. In a frequency selector device having a master oscillator generating a base frequency of 32 kilocycles, multiplying means connected to said master oscillator and producing the 26th and 27th harmonics of said base frequency, a frequency generator producing various frequencies between the 14th and 16th harmonics of said base frequency, a selector unit comprising a pair of inlet terminals and an outlet terminal, a two-way selector switch connected to the first inlet terminal, said frequency generator connected to said second input terminal, a divider in the selector unit connected to said second input terminal, said two-way switch connectible with either the 26th or 27th harmonic from said multiplying means, mixing means connected to said divider and said two-way selector switch and either the 26th and 27th harmonic selected by the two-way switch, and a band pass filter connected to said mixing means and passing the frequencies between the 18th–20th harmonic to said output terminal.

9. Apparatus for obtaining a plurality of frequencies with an accuracy of the same order of a master oscillator comprising harmonic generating means receiving an input from said master oscillator, a plurality of A selector units, a plurality of B selector units and the A and B selector units connected so that each A unit furnishes an output to a succeeding B unit and each B unit feeds an output to a succeeding A unit, switching means on each selector unit capable of being switched to connect an output from said harmonic generating means, and with the output of the last B selector unit giving the desired selected frequency.

10. In a system according to claim 9 wherein the output of the last B selector unit is fed to a first multiplying means, a mixer receives the output of said multiplying means and a second output from said harmonic generating means, a low pass filtering means receiving the output of said mixer, and the output of said filtering means furnished as the usable selected frequency.

11. A binary frequency selecting system for obtaining any one of a plurality of frequencies very accurately comprising, a master oscillator, first frequency dividing means receiving the output of said oscillator and dividing its frequency by two, second dividing means receiving the output of said first divider and dividing it by two, first multiplying means receiving an output from said first divider to multiply the frequency by 13, second multiplying means connected to said master oscillator to multiply its output by six, third multiplying means connected to said second divider to multiply its frequency by 25, fourth multiplying means connected to said second divider to multiply its frequency output by nine, a plurality of first switches movable between contacts which are connected respectively to the outputs of the second multiplying means and the third multiplying means, a plurality of second switches movable between contacts which are connected respectively to the outputs of said first multiplying means and said fourth multiplying means, a plurality of A selector units comprising third dividing means, first mixing means, and first filtering means and with each selector unit receiving an output from one of said first switches, a plurality of B selector units comprising fourth dividing means, second mixing means, and second filtering means, and with each B selector unit connected to one of said second switching means, and with the output of the first A selector unit connected to the input of the first B selector unit and the output of the first B selector unit connected to the input of the second A selector unit, and so on, until the last B selector unit is reached, tunable frequency generating means connected to the input of said first A selector unit to allow interpolation, and the output of said last B selector unit furnishing a plurality of outputs with an accuracy of the same order as that of the master oscillator and depending upon the settings of the first and second switches.

12. In a system according to claim 11 wherein the output of said master oscillator is 128 kilocycles and the output of said tunable frequency generating means is between 576–640 kilocycles and the output of the final B selector unit is between 576–640 kilocycles with $2^n$ equally spaced steps being obtainable wherein $n$ represents the total number of selector units, counting both A and B units.

13. A system according to claim 11 wherein the output of the last selector unit is fed to fifth multiplying means which multiplies the output by 32, sixth multiplying means receiving an output from the third multiplying means and multiplying it by 24, third mixing means receiving the output of said fifth and sixth multiplying means, and low pass filtering means receiving the output of said third mixing means to select the frequency difference between the inputs.

14. In a frequency selecting scheme having a master oscillator and harmonic generating means connected to said master oscillator, a B selector unit comprising dividing means receiving an output from said harmonic generating means and dividing its frequency by two, a first band-pass filter receiving the output of said divider and passing frequencies between 224–256 kilocycles, mixing means receiving the output of said first filter and receiving a second output from said harmonic generating means which may be either 768 kilocycles or 800 kilocycles, second filtering means receiving the output of said mixer to band-pass an output between 576–640 kilocycles.

References Cited in the file of this patent

UNITED STATES PATENTS

| Number | Name | Date |
|---|---|---|
| 2,295,615 | Tucker | Sept. 15, 1942 |
| 2,423,103 | Koechlin | July 1, 1947 |
| 2,445,664 | Doelz | July 20, 1948 |